(12) United States Patent
Woods et al.

(10) Patent No.: US 12,386,249 B2
(45) Date of Patent: Aug. 12, 2025

(54) LED ILLUMINATED PROJECTOR

(71) Applicant: Snap Inc., Santa Monica, CA (US)

(72) Inventors: David Woods, Chinnor (GB); Brennon Pennell, Canterbury (GB)

(73) Assignee: SNAP INC., Santa Monica, CA (US)

( * ) Notice: Subject to any disclaimer, the term of this patent is extended or adjusted under 35 U.S.C. 154(b) by 324 days.

(21) Appl. No.: 18/001,839

(22) PCT Filed: Jun. 9, 2021

(86) PCT No.: PCT/EP2021/065487
§ 371 (c)(1),
(2) Date: Dec. 14, 2022

(87) PCT Pub. No.: WO2021/259642
PCT Pub. Date: Dec. 30, 2021

(65) Prior Publication Data
US 2023/0236488 A1    Jul. 27, 2023

(30) Foreign Application Priority Data

Jun. 22, 2020 (EP) .................... 20181444

(51) Int. Cl.
*G03B 21/20* (2006.01)
*G03B 21/14* (2006.01)
(Continued)

(52) U.S. Cl.
CPC ....... *G03B 21/2013* (2013.01); *G03B 21/142* (2013.01); *G03B 21/2033* (2013.01);
(Continued)

(58) Field of Classification Search
CPC .............. G03B 21/2013; G03B 21/142; G03B 21/2033; G03B 33/14; G03B 33/12
(Continued)

(56) References Cited

U.S. PATENT DOCUMENTS

| 2001/0024326 A1* | 9/2001 | Nakamura | ........... H04N 9/3185 |
| | | | 348/E9.027 |
| 2006/0114421 A1* | 6/2006 | Bergman | ............. G02B 21/006 |
| | | | 348/E9.027 |

(Continued)

FOREIGN PATENT DOCUMENTS

| CN | 111295612 A | 6/2020 |
| EP | 4168852 A1 | 4/2023 |

(Continued)

OTHER PUBLICATIONS

"International Application Serial No. PCT/EP2021/065487, International Search Report mailed Oct. 14, 2021", 4 pgs.

(Continued)

*Primary Examiner* — Jerry L Brooks
(74) *Attorney, Agent, or Firm* — SCHWEGMAN LUNDBERG & WOESSNER, P.A.

(57) ABSTRACT

A projector for generating a frame of an image is disclosed, comprising an array of elements arranged in a plane, each element comprising at least three LEDs which have different respective colours, and an array of collector structures, each configured to receive light from a single LED at any one time and reduce the angle over which the LED emits light. A projector unit is configured to receive the light from the array of collector structures and collimate the light such that a full colour frame is formed from combining a plurality of subframes formed through a spatial movement of the array of elements with respect to the array of collector structures such that each collector structure receives light from a different LED during each subframe, and/or a displacement of the light emitted from each LED such that the light from each LED illuminates multiple pixels of the frame.

20 Claims, 17 Drawing Sheets

(51) Int. Cl.
*G03B 33/12* (2006.01)
*G03B 33/14* (2006.01)

(52) U.S. Cl.
CPC ......... *G03B 21/2046* (2013.01); *G03B 33/14* (2013.01); *G03B 33/12* (2013.01)

(58) Field of Classification Search
USPC .......................................................... 353/31
See application file for complete search history.

(56) References Cited

U.S. PATENT DOCUMENTS

| | | | |
|---|---|---|---|
| 2009/0257030 A1 | 10/2009 | Klosowiak et al. | |
| 2013/0114049 A1* | 5/2013 | Li | G03B 21/2013 362/231 |
| 2019/0227319 A1* | 7/2019 | Trail | G09G 3/007 |

FOREIGN PATENT DOCUMENTS

| | | | | |
|---|---|---|---|---|
| KR | 20230027094 | A | 2/2023 | |
| TW | 201403130 | A | 1/2014 | |
| WO | WO-2004057863 | A1 | 7/2004 | |
| WO | WO-2009067678 | A2 | 5/2009 | |
| WO | WO-2011026005 | A2 * | 3/2011 | ........... G03B 21/204 |
| WO | WO-2021259642 | A1 | 12/2021 | |

OTHER PUBLICATIONS

"International Application Serial No. PCT/EP2021/065487, Written Opinion mailed Oct. 14, 2021", 6 pgs.
"European Application Serial No. 21729906.4, Communication Pursuant to Article 94(3) EPC mailed Jan. 23, 2025", 5 pgs.
"European Application Serial No. 21729906.4, Response to Communication pursuant to Rules 161(1) and 162 EPC filed Apr. 11, 2023", 61 pgs.
"International Application Serial No. PCT/EP2021/065487, International Preliminary Report on Patentability mailed Jan. 5, 2023", 8 pgs.
"Korean Application Serial No. 10-2022-7046151, Notice of Preliminary Rejection mailed Dec. 31, 2024", W/English Translation, 7 pgs.
"Korean Application Serial No. 10-2022-7046151, Response Filed Feb. 21, 2025 to Notice of Preliminary Rejection mailed Dec. 31, 2024", w/ English Claims, 22 pgs.
"Taiwanese Application Serial No. 110118776, Office Action mailed Jan. 14, 2025", w/ English machine translation, 26 pgs.
"Taiwanese Application Serial No. 110118776, Response filed Apr. 15, 2025 to Office Action mailed Jan. 14, 2025", W/ English Claims, 39 pgs.

* cited by examiner

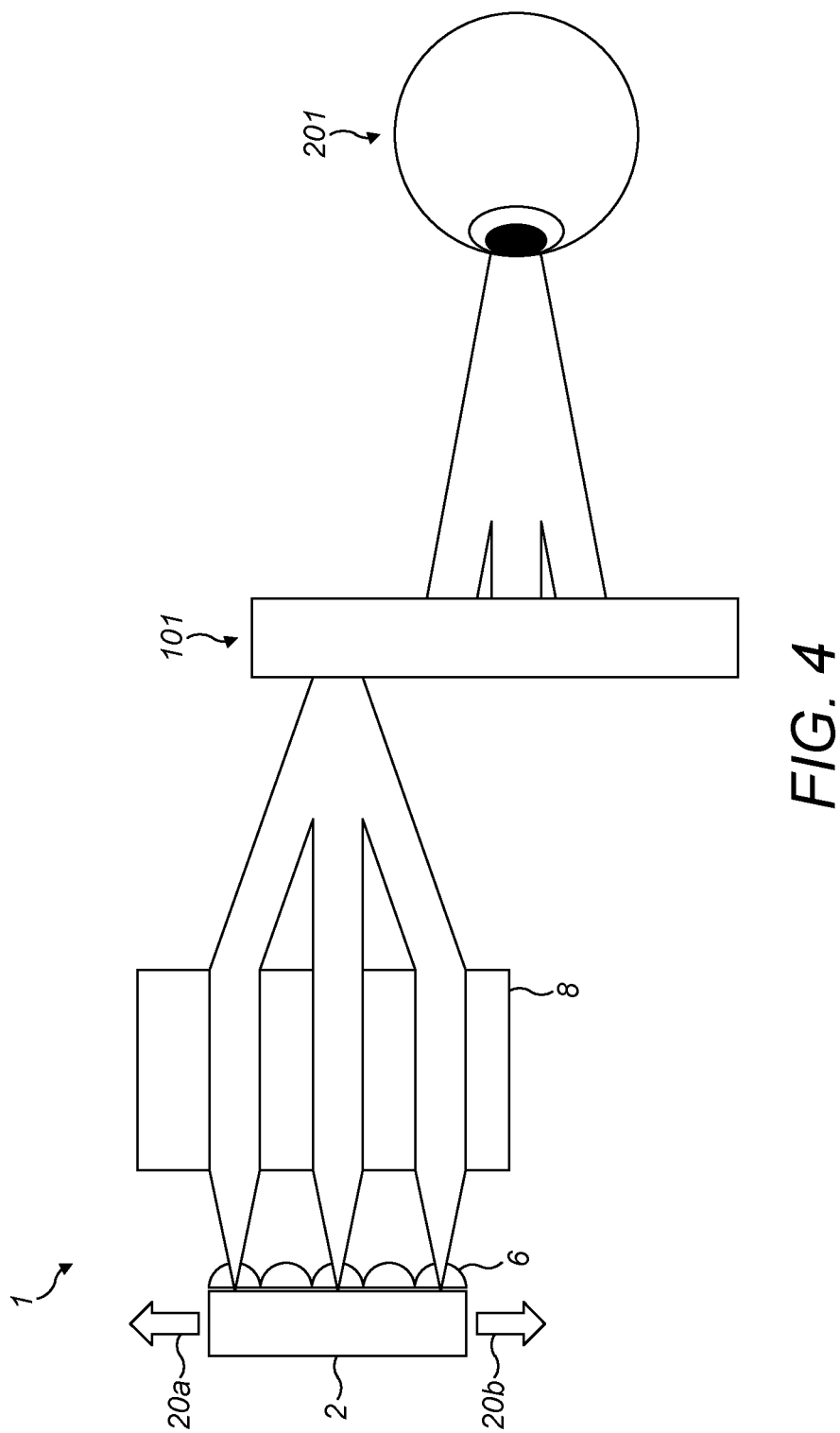

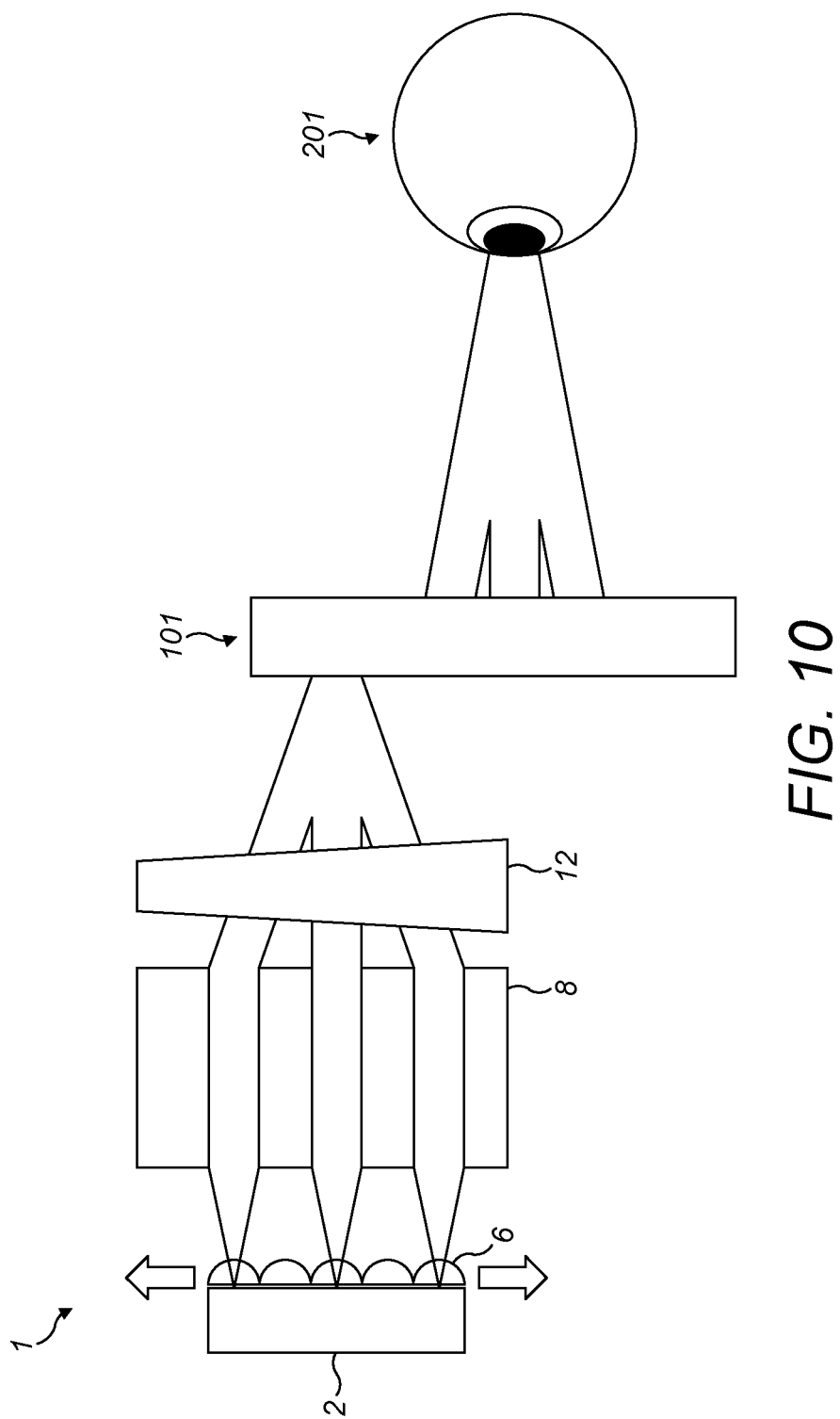

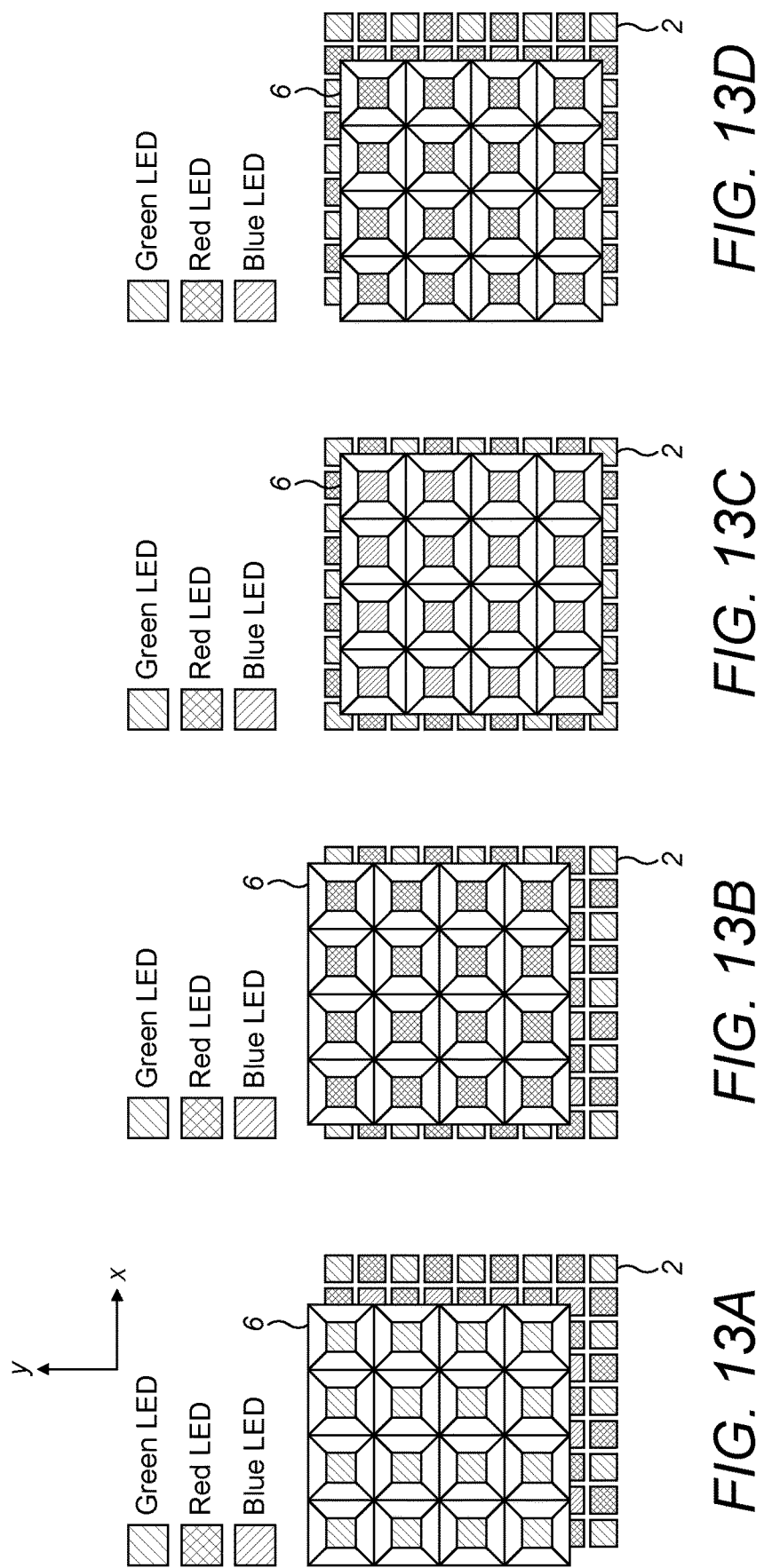

LED ILLUMINATED PROJECTOR

CLAIM OF PRIORITY

This application is a U.S. national-phase application filed under 35 U.S.C. § 371 from International Application Serial No. PCT/EP2021/065487, filed on Jun. 9, 2021, and published as WO 2021/259642 on Dec. 30, 2021, which claims the benefit of priority to EP Application Serial No. 20181444.9, filed on Jun. 22, 2020, each of which are incorporated herein by reference in their entireties.

FIELD

The present invention relates to projectors. In particular, projectors for use in waveguide systems.

BACKGROUND

Projectors for handheld devices such as pico projectors, and wearable devices such as virtual reality (VR) and augmented reality (AR) headsets, need to be light weight and comfortable for the user who may be holding or wearing the device for long periods at a time.

Currently known projection systems include a source for generating light, optics for forming this light into ray paths, a homogeniser for making these ray paths homogenous, and a relay for relaying the homogenised ray paths onto the display to be illuminated.

Ideally, it would be desirable to use an array of LEDs to act as the source for generating light as the LEDs can also produce the image, rather than relying on having a modulating display to generate the image which requires a separate illuminator. With the advent in micro LEDs it would appear that their use may enable increasingly smaller projectors.

Theoretically self-emissive panels, which both generate light and produce the image, should provide improvements in size to reflective panels as separate elements are not required to provide the light. This should also lead to improvements in the efficiency, brightness and contrast of the image.

However, LEDs are Lambertian emitters and so emit light over a wide range of angles. This can lead to problems in the efficiency of the system as a large percentage of emitted light may be lost. Optics can be used to help ensure that a maximum amount of emitted light is collected. However, this increases the size of the system. In addition, as each LED only generates a single colour, multiple LEDs of different colours are required to generate a single image pixel. This puts constraints on the resolution that is achievable for a specific size of system.

SUMMARY OF INVENTION

According to an aspect of the invention there is provided a projector for generating a frame of an image, the projector comprising: an array of elements arranged in a plane, each element comprising at least three LEDs which have different respective colours; an array of collector structures, each collector structure configured to receive light from a single LED at any one time and reduce the angle over which the LED emits light; a projector unit configured to receive the light from the array of collector structures and collimate the light such that a frame is formed; wherein the frame is full colour and formed from combining a plurality of subframes, the subframes formed through a spatial movement of the array of elements with respect to the array of collector structures such that each collector structure receives light from a different LED during each subframe, and/or a displacement of the light emitted from each LED such that the light from each LED illuminates multiple pixels of the frame.

LEDs are lambertian emitters and as such emit light over a wide range of angles. The collector structures enable collection of the light emitted from the LEDs reducing the angles over which the light is emitted. This enhances the efficiency of the projector as the light emitted by the LEDs can be efficiently collected into a light path towards a display rather than being lost.

In this way, the array of LEDs can be arranged into a small area whilst also providing a full colour display without trade off with image resolution, despite a single collector structure only able to be illuminated by a single LED at any one time. The movement of the array of elements and collectors with respect to each other, and/or the displacement of light from each LED, each done so quicker than the frame rate, can achieve an image that is full colour with no loss of resolution.

The displacement of the light may be a spatial or angular displacement. For instance, a spatial displacement may occur before the light has been collimated. An angular displacement may occur after the light has been collimated.

Preferably each of the at least three LEDs has an associated collector structure. In some arrangements each collector structure may be associated with a single LED. In other arrangements, each collector structure may be associated with a single element, such that for each element the at least three LEDs are associated with the same collector structure. As only the light from a single LED may be collected by a single collector at any one time this may require the relative movement between the collectors and LEDs.

Preferably, the projector unit comprises an optical element that is configured to be adjustable for causing the displacement of the light emitted from each LED such that the light from each LED illuminates multiple pixels of the frame.

In this way, the resolution of the frame that is generated is maintained despite having different LEDs of different colours, through the optical element causing the displacement of the light such that it is incident at multiple pixels for each frame. The optical element may move at such a speed that it can project the light from each LED to a plurality of distinct pixels on the display over a time period that is equal to or less than the time period over which the full colour frame is displayed.

The optical element is preferably a ray angle shifter that is capable of adjusting the angular position of the light. For instance, the optical element may be an adjustable mirror. The mirror may be configured to switch between a plurality of positions or orientations so as to provide the displacement of the light. Alternatively, any type of electromechanical device may be used that can be configured to cause the change in direction of the light.

Alternatively, the displacement may be an apparent optical motion. This may be provided by an oscillating wedge. The oscillating wedge may be comprised of glass. Alternatively, the optical element may be a shifting plate that moves in angle. For instance a nutating plate may be positioned after the collector array before the projector unit. The nutation of the plate, through tilting in different directions, may provide the displacement of the light.

The displacement of the light may be through a yaw rotation (vertical axis), and/or a pitch rotation (transverse axis) of the optical element. Thus, the light may experience a yaw and/or pitch rotation. In other words, it may be in the x-direction and/or y direction. This may depend on the arrangement of the LEDs in the plane. If different colour LEDs are arranged in the horizontal direction in the plane the displacement may be caused by a yaw rotation. Alternatively, if different colour LEDs are arranged in the vertical direction in the plane the displacement may be caused by a pitch rotation. Alternatively, it may be a combination of pitch and yaw.

In other arrangements the light from each LED may illuminate multiple pixels of the frame instead (or in addition) through a movement of the array of collectors and array of elements with respect to the projector unit.

The projector unit may further comprise a projector lens and the adjustable optical element. The projector lens converts the light from spatial positions to angular positions to form the image frame. Alternatively, in arrangements where there is no displacement of the light emitted from each LED the projector unit may comprise only the projector lens.

The array of elements may be configured to be moveable to provide the spatial movement of the array of elements with respect to the array of collector structures. In this way, the collector structures may be static with respect to the other optics in the projector. As the collectors are static there may be no need for further shifting of the light to form the frame. The array of elements may comprise a mechanism for providing the movement. The movement may be along the plane.

Alternatively, the array of collector structures may be configured to be moveable to provide the spatial movement of the array of elements with respect to the array of collector structures. In this way, the elements may be static with respect to the other optics in the projector and the display from where the user views the light. The movement of the array of collectors enables light from each of the LEDs to be collected during each frame. The array of elements may comprise a mechanism for providing the movement. The movement may be along the plane.

In some arrangements, during a first subframe the collector structures may receive light from a first of the at least three LEDs, during a second subframe the collector structures may receive light from a second of the at least three LEDs, and during a third subframe the collector structures may receive light from a third of the at least three LEDs.

Preferably, each collector receives light from each LED of the element for the same time period. In this way, each subframe may have the same intensity.

In some arrangements, where there are n LEDs in an element, there may be n subframes. Thus, the collector structures and/or elements may be movable between n different positions, i.e. the number of distinct positions at least equal to the number of LEDs in an element.

In other arrangements, both the array of collector structures and the array of elements may comprise mechanisms such that they are both movable to achieve the above described relative movement.

In some arrangements, the elements are arranged along a first axis extending in a first direction in the plane and along a second axis extending in a second direction in the plane, wherein the first axis and the second axis are orthogonal to each other, and each element comprises LEDs of different colours arranged along at least the first direction, wherein the array of elements or collectors are configured to be movable with respect to the collectors along the first direction. In this way, resolution of the projector, may be increased along an axis where some LEDs in that axis are different colours to each other. For instance, this may be in the x- or y-axis. This can be used to restore the resolution in that axis to equal the number of LEDs in that axis, despite the fact that different colour LEDs may be present in the axis.

Each element may comprise different colour LEDs arranged along the first direction and the second direction, wherein the array of elements or collectors are configured to be movable along the first and second direction. Thus, the resolution can be increased in both axis despite having different colour LEDs in each axis.

The displacement of the light may also be in the directions as described above for the movement of the elements and collectors depending on the arrangement of the LEDs.

In some arrangements, each subframe may be a single colour. In this way, during each subframe each of the collectors are illuminated by LEDs having the same colour. The combination of each subframe, in this colour sequential way, may provide a full colour image.

In other arrangements each subframe may comprise different colours. For instance different collectors may collect light from different colour LEDs in each subframe, with each collector collecting light from all of the different colour LEDs over the combination of subframes to form the full colour image frame.

Each collector may be associated with a single LED, such that each subframe comprises each of the different respective colours. In this way, there may be no movement between the LEDs (and elements) with respect to the collector structures. In this arrangement the displacement of the light from each LED ensures no loss in resolution. Advantageously, this requires fewer moving parts. This may provide the advantage of this projector being a quieter device.

In some arrangements, each LED is configured to illuminate a single pixel in each subframe, wherein the displacement of the light causes the single pixel illuminated to be different in each subframe. In this way, during a first subframe each LED of each element each illuminate a single pixel and in the subsequent subframe illuminates a different pixel that was illuminated in the previous subframe by a different colour LED. This provides a frame that is full colour. For instance, a first pixel may be illuminated by an LED having a first colour during a first subframe, and may be illuminated by an LED having a second colour during a second subframe.

In some arrangements, each subframe that is formed may be shifted in the plane by one pixel. For instance, during a first subframe each LED may illuminate a pixel and in a subsequent subframe the LED may illuminate an adjacent pixel to the one in the previous frame. This may be a pixel in the adjacent column or adjacent row. In this way each subsequent subframe may be shifted across (or up/down) by a pixel compared to the preceding subframe.

Preferably, the array of collector structures are an array of microlenses, and/or tapered well structures. Using microlenses the angles of light rays emitted from the LEDs can be reduced. In addition, their small size enables their use in systems such as pico-projectors.

Alternatively, or in addition, to microlenses the collector structure array may be a tapered well structure array. The walls of the tapered well structures act as a conduit for the light emitted from the LEDs. Preferably, the tapered well structures have a first end configured to receive a beam of light from the LEDs, and a second end for emitting said beam of light. The first end is preferably smaller than the second end, such that the light can be expanded in two dimensions and the beam angle reduced by the tapered well structure. Preferably, the walls of the tapered well structure are glass, with the light reflecting along the walls. Alternatively, the collector may be a tapered light pipe that acts as a conduit through which the light passes. The light pipe also may reduce the beam angle and expand the light in two dimensions. Thus etendue is preserved with the collectors.

The at least three LEDs may comprise a red LED, a blue LED and a green LED. In this way, each frame can be full colour. Alternatively, the LEDs may be red, yellow, and blue. Where there are four LED in an element the additional LED may be white.

Alternatively, the element may comprise multiple LEDs of the same colour. For instance, the element may comprise LEDs that are be red, green, blue and red. In this arrangement, the collectors may be arranged to sequentially collect light from each of the four LEDs of the element over a time period that is equal to or less than the time period over which each individual frame is displayed. In this way, each LED may contribute to a subframe. The efficiency of the image may be improved in some situations by have more than one red LED owing to the red LED being less efficient. In other arrangements, any combination of colours may be used.

Preferably, each element comprises three LEDs, or four LEDs. In arrangements where there are three LEDs they may be arranged in a row. In this way, the array of elements may be arranged such that each column may comprise LEDs of the same colour. Alternatively, the three LEDs may be arranged in a column. In this way, the array of elements may be arranged such that each row may comprise LEDs of the same colour. Alternatively, the LEDs of each element may be arranged diagonally.

In arrangements where each element comprises four LEDs the LEDs may be arranged in a 2 by 2 configuration in the plane. Each element may have four LEDs arranged in a 2 by 2 matrix. In other words each element may have two columns and two rows of LEDs. In other arrangements the LEDs may be arranged in a 3 by 1 configuration as described above, or a 1 by 3 configuration. Alternatively, they may be arranged in a 4 by 1 configuration.

Preferably, in a first subframe a first LED of the at least three LEDs illuminates a first pixel, in a second subframe a second LED of the at least three LEDs illuminates the first pixel, and in a third subframe a third LED of the at least three LEDs illuminates the first pixel. In this way, each pixel of the image frame is formed by light from each of the different colour LEDs forming the full colour image.

Preferably, the LEDs are microLEDs. By using micro LEDs coupled with a microlens array or an array of tapered well structures, the size of the collection optics can be reduced. The efficiency of the device is also improved compared to other types of light sources or conventional LEDs. As outlined above, LEDs are Lambertian emitters i.e. they emit light over a wide range of angles, typically $2\pi$ steradians. MicroLEDs, when coupled with a microlens or micro-well structure array are not Lambertian emitters and emit over a much smaller range of angles, resulting in less light lost.

In some arrangements the number of subframes is equal to the number of LEDs in an element. For instance, when there are three LEDs there may be three subframes. So for an element comprising RGB LEDs the number of subframes may be three.

In a further aspect of the invention there is provided an augmented reality, or virtual reality device, comprising the projector of the above described aspect.

According to a further aspect there is provided a projector display system comprising: a display for displaying an image; and the projector according to the above aspect.

The display may be a Waveguide. For instance, it may be a waveguide for an augmented reality (AR) or virtual reality (VR) device.

According to a further aspect there is provided a method of generating a frame of an image using a projector, the method comprising: emitting light from an array of elements arranged in a plane, each element comprising at least three LEDs which have different respective colours; receiving the light emitted from the array of elements at an array of collector structures, each collector structure receiving light from a single LED at any one time to reduce the angle over which the LED emits light; emitting the light from an array of collector structures that has been reduced in angle; receiving the light from the array of collector structures at a projector unit and collimating the light such that a frame is formed; wherein the frame is full colour and formed from combining a plurality of subframes, the subframes formed through a spatial movement of the array of elements with respect to the array of collector structures such that each collector structure receives light from a different LED during each subframe, and/or a displacement of the light emitted from each LED such that the light from each LED illuminates multiple pixels of the frame.

DESCRIPTION OF FIGURES

FIG. 4 is a top down schematic view of a projector according to an embodiment of the present invention shown projecting an image into a waveguide for a user to view;

FIG. 10 is a top down schematic view of a projector according to a further embodiment of the present invention shown projecting an image into a waveguide for a user to view;

FIG. 13A to 13D shows face on schematic views of the movement of the collectors with respect to the LED array for the projector as shown in FIG. 10;

DETAILED DESCRIPTION

The difficulties of using LEDs as an image source for projectors is shown and described with reference to FIGS. 1A-3B.

Figure 1A:
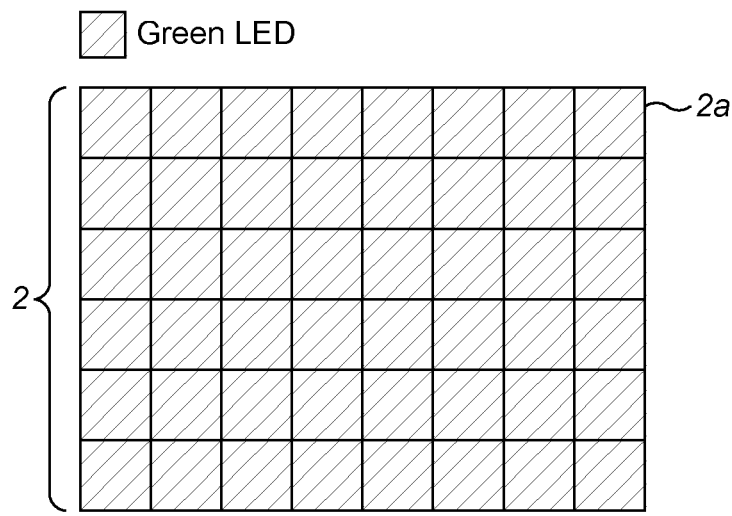
FIGS. 1A and 1B are face on and side on schematic views respectively, of a green LED panel.
Figure 1B:
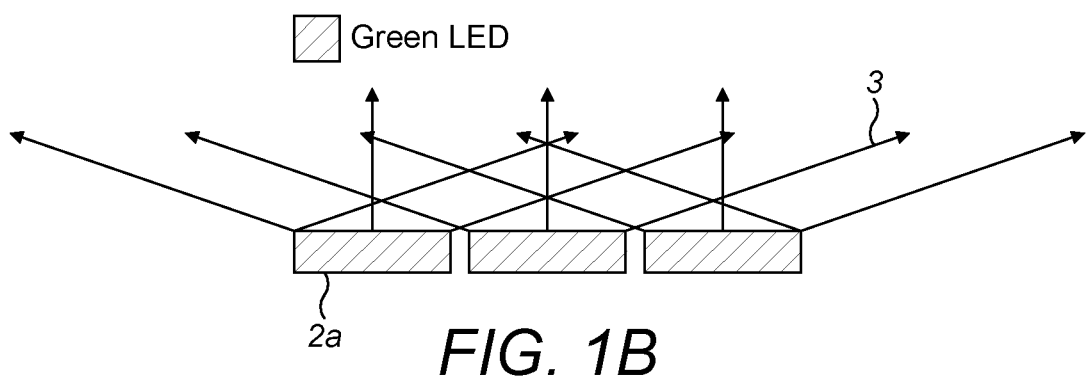

FIG. 1A shows a face on view of an array of green LEDs 2 arranged in a plane. FIG. 1B shows a side on view of three green LEDs 2a of the array 2 along with the light 3 emitted from said LEDs. A key is included at the top of FIG. 1A, and the other Figures, to indicate the colour of the LEDs shown in the figures. As can be seen from FIG. 1B the light is emitted from each LED 2a over a wide range of angles as LEDs are Lambertian emitters. This is problematic for use in a projection display as the light from each LED is dispersed over a wide area rather than forming a beam of light required to project and form an image.

Figure 2A:
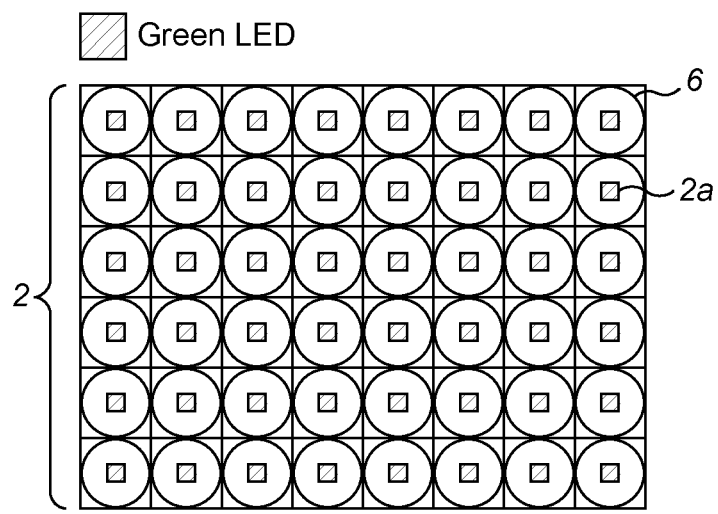
FIGS. 2A and 2B are face on and side on schematic views respectively, of a green LED panel and corresponding collectors.
Figure 2B:
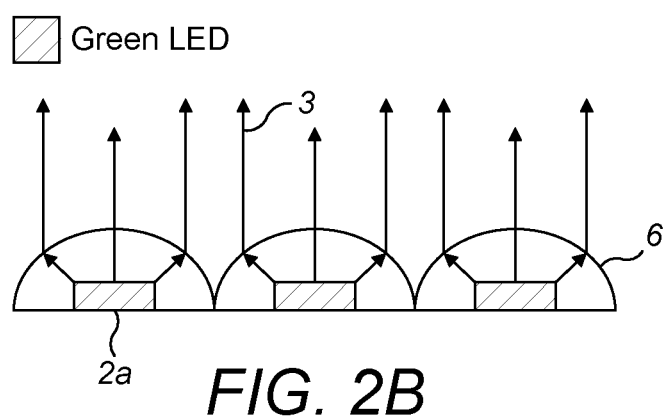

FIG. 2A shows a face on view of an array of green LEDs 2 showing a potential solution to the problem of the Lambertian emission. An array of collectors 6 is arranged over the array of green LEDs 2. FIG. 2B shows a side on view of this arrangement. As can be seen from FIG. 2B the collectors 6 reduce the angle over which the light from the LEDs 2 is emitted. However, as can be seen in FIGS. 1B and 2B the size of the LEDs 2a are smaller when using collectors 6 to ensure all of the light from each LED 2 is collected by its associated collector.

Figure 3A:
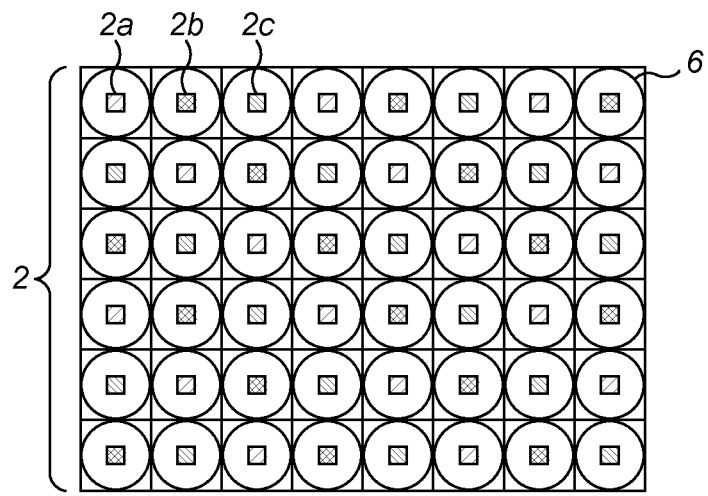
FIGS. 3A and 3B are face on, and side on, schematic views, respectively, of an LED panel of red, green, and blue LEDs and their corresponding collectors.
Figure 3B:
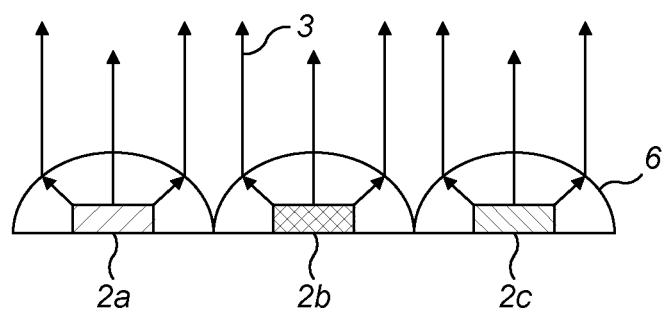

The arrangement shown in FIGS. 2A and 2B would only produce an image of a single colour as all of the LEDs emit green light. FIGS. 3A and 3B show an arrangement of LEDs 2 and collectors 6 capable for producing a full colour image. In this arrangement the LED panel 2 comprises green LEDs 2a, red LEDs 2b, and blue LEDs 2c. However, for the same area the number of LEDs of the same colour is reduced by ⅓, thus producing an image that has ⅓ of the number of full colour pixels in each dimension compared to a single colour panel as shown in FIG. 2A. For instance, if the array of LEDs shown in FIG. 2A forms an image of 1920 pixels in the horizontal direction (i.e. 1920 LEDs in this dimension) the number of pixels in FIG. 3A is reduced to 640. This reduces the resolution size that is achievable when a full colour image is required.

This presents a problem of using LEDs as a projector image source for a full colour image, whilst maintaining the resolution of the display without greatly increasing the size of the system.

An aim of the present invention is to overcome these problems to provide a projector capable of producing a full colour image without compromising on size of the system and the resolution achieved.

FIG. 4 shows a top down schematic view of a projector 1 according to an embodiment of the present invention. The projector 1 is shown as projecting an image into waveguide 101. The image is then viewed by the user 201.

The projector 1 comprises an LED panel 2. Positioned next to the LED panel 2 is a collector array 6. Between the collector array 6 and the waveguide 101 is projector unit which comprises projector lens 8.

The LED panel 2 produces light, acting both as the image source and the light source. The light from the LEDs is collected by the collectors 6 to reduce the angle over which the light is emitted from the LEDs solving the Lambertian emission problem described above. The light from the collectors 6 is then received at the projector lens 8. The projector lens 8 collimates the light converting the positional (spatial) image into an angular image. At the LED panel 2 each pixel of the generated image has a spatial position. After the projector lens 8, where the positional image has been converted to angular image, each pixel is represented by an angle (in azimuth and elevation).

The image is then projected onto an input grating of the waveguide 101. The light then projects down the waveguide 101 exiting the waveguide 101 at an output grating viewed as an image in the eye of the user 201.

Figure 5A:
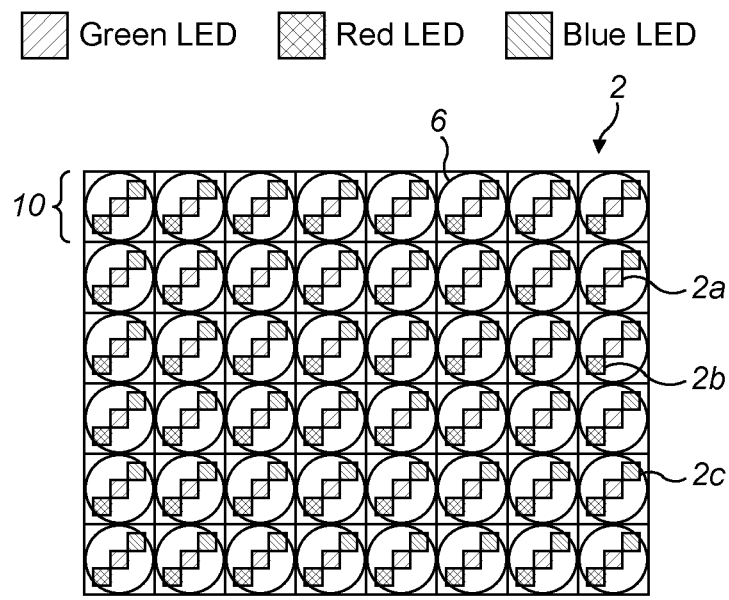
FIGS. 5A to 5C are face on views of the LED panel and collector array of the projector shown in FIG. 4, showing the different positions of the collectors with respect to the LED panel.

FIG. 5A shows a face on view of the LED panel 2 and collector array 6 of the projector 1 shown in FIG. 4. As can be seen the LED panel 2 has green LEDs 2a, red LEDs 2b, and blue LEDs 2c. The LEDs can be considered to be arranged into elements 10, each element 10 comprising a red 2b, green 2a and blue LED 2c. As can be seen the LEDs 2 of each element 10 are arranged in a diagonal arrangement. However, in other embodiments they could equally be arranged in a horizontal or vertical arrangement. The array of LEDs 2 can be effectively considered to be the same arrangement of green LEDs 2a as shown in FIG. 2A, with an additional red 2b and blue 2c LED positioned in the unused spaces between each of the green LEDs 2a. This provides a better use of space as it enables placement of each of the three colours of LEDs within the same area as shown in layout in FIG. 2A.

Each collector structure 6 can only collect light from the LED that is directly beneath it. The LED panel 2 is movable with respect to the collectors 6 as indicated by arrows 20a 20b in FIG. 4. In this way, each LED 2 of an element 10 can be positioned sequentially underneath its associated collector 6 such that the light from each LED 2 is collected by the collector 6. This is shown in more detail in FIG. 5A to 5C.

In FIG. 5A the green LED 2a is positioned underneath the collector 6 such that the collectors 6 only collect light from the green LEDs 2a, forming a green subframe image.

Figure 5B:
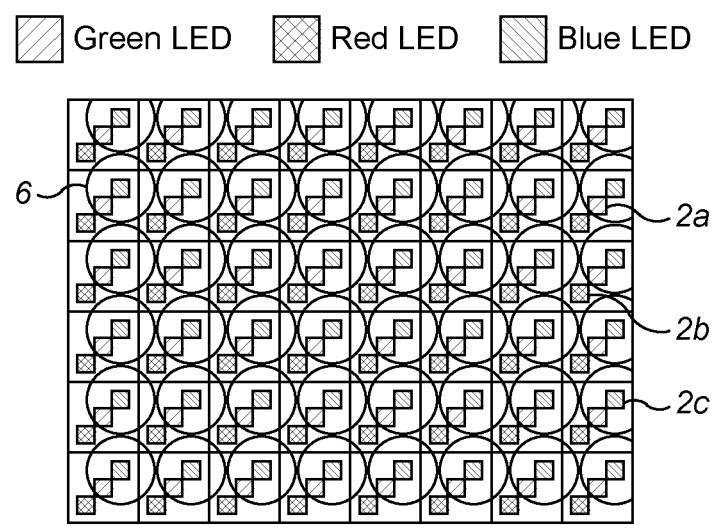

In FIG. 5B the LED panel 2 has moved such that the blue LEDs 2c are positioned underneath the collectors 6 such that in this position only light from the blue LEDs 2c is collected, forming a blue subframe image.

Figure 5C:
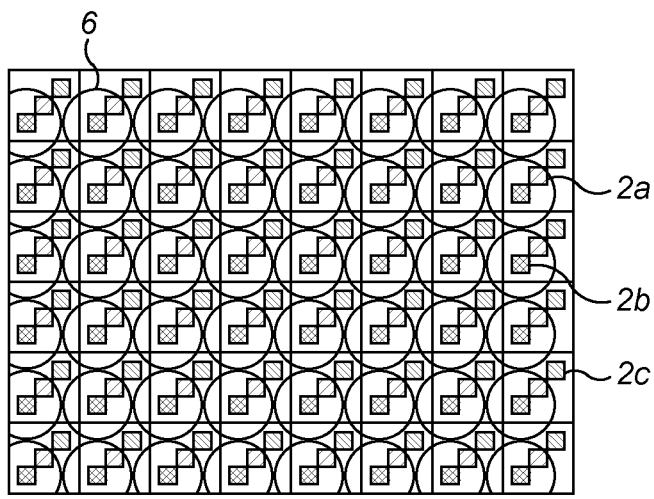

In FIG. 5C the LED panel 2 has moved such that only the red LEDs 2b are positioned underneath the collectors 6 such that only light from the red LEDs 2b is collected, forming a red subframe image.

Figure 5D:
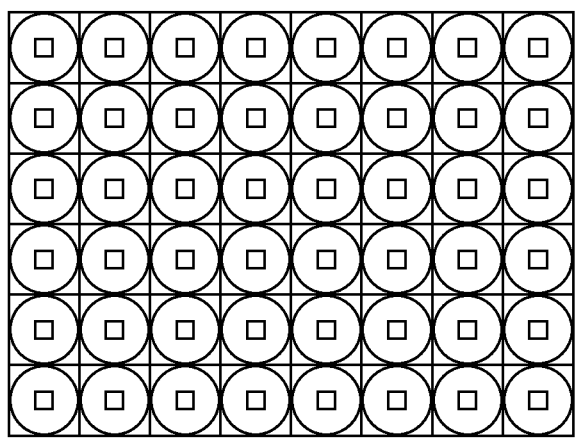
FIG. 5D is a face on view of the full colour image frame produced from the light from each of the positions shown in FIG. 5A to 5C.

The movement of the LED panel between each of the positions shown in FIGS. 5A to 5C may occur at, or quicker than, the frame rate. Thus, each of the positions 5A to 5C are responsible for producing a single colour subframe. Through combining each of the subframes a full colour frame is produced as shown in FIG. 5D. The number of pixels in the full colour frame is equal to the number of collectors 6. Thus, there is no loss in resolution when producing the full colour image.

Figure 6:
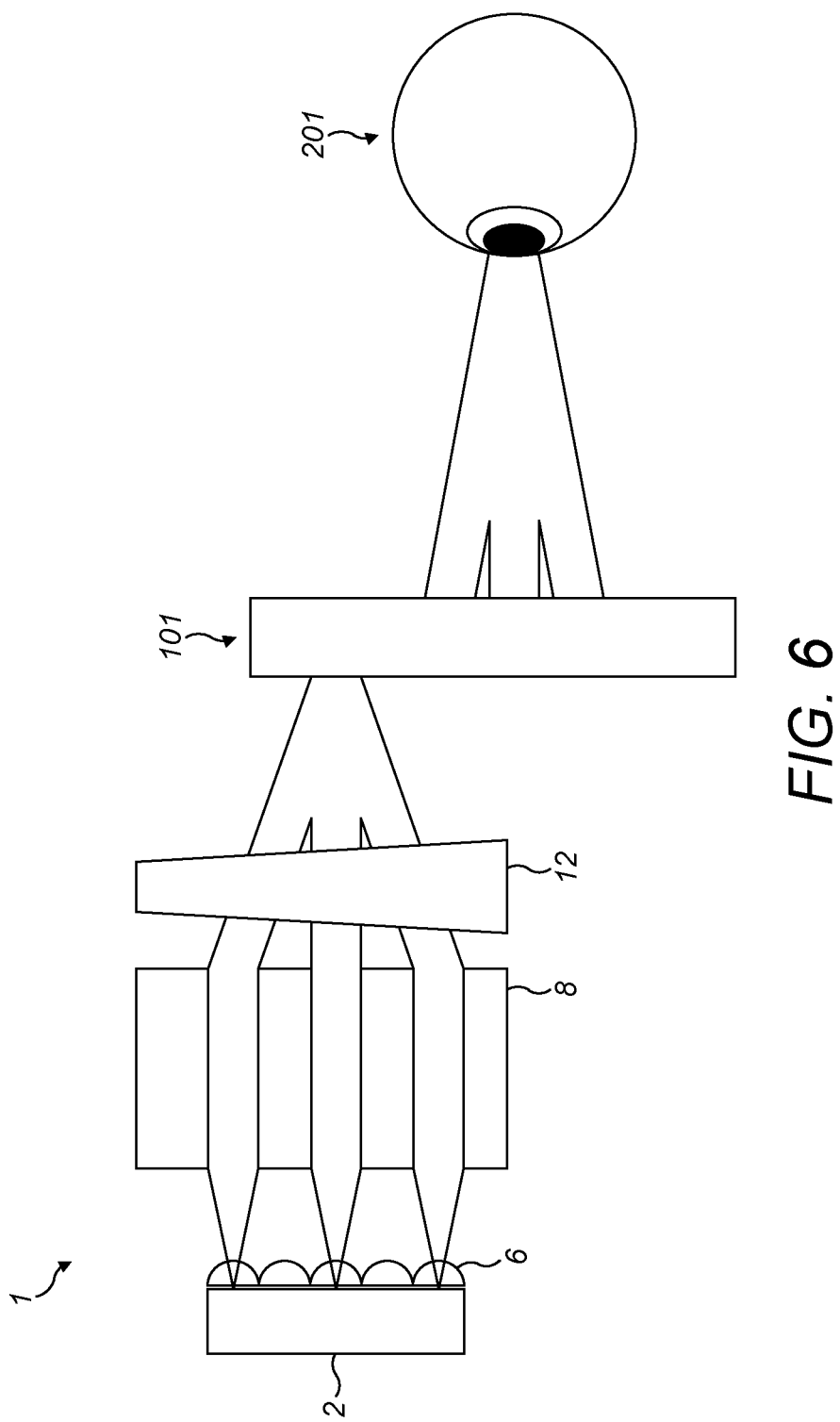
FIG. 6 is a top down schematic view of a projector according to a further embodiment of the present invention shown projecting an image into a waveguide for a user to view.

FIG. 6 shows a schematic top down view of a projector 1 according to another example embodiment of the present invention. The projector 1 is shown as projecting an image into waveguide 101 which is subsequently viewed by a user 201.

The projector 1 shown in FIG. 6 has an LED panel 2, a collector array 6 and a projector lens 8 similar to the projector as shown in FIG. 4. In addition, projector 1 includes ray angle shifter 12 arranged between projector lens 8 and the waveguide 101. In the projector 1 shown in FIG. 6 the LED panel 2 is not movable with respect to the collector array 6, unlike the embodiment shown in FIG. 4.

Figure 7:
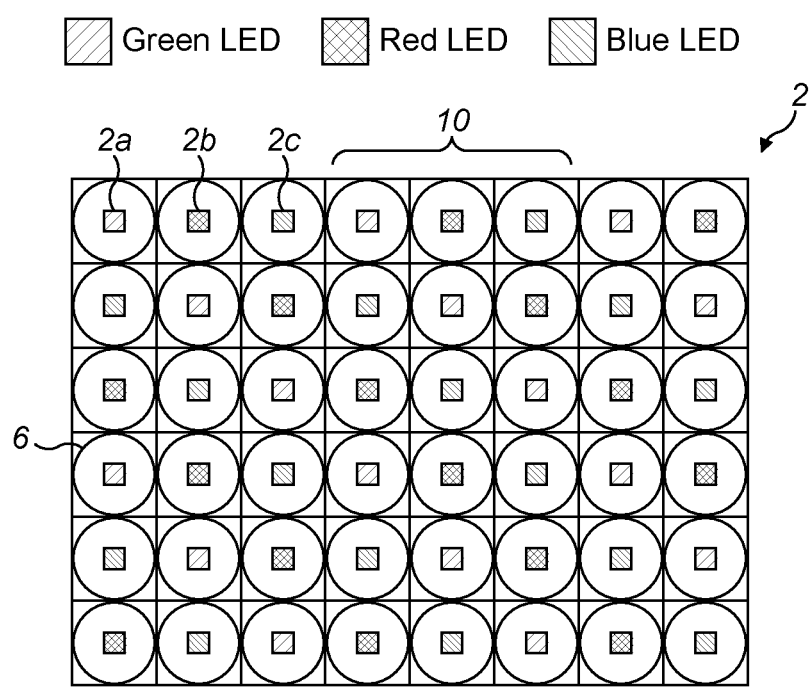
FIG. 7 is a face on view of the LED panel and collector array of the projector shown in FIG. 6.

FIG. 7 shows a face on view of the LED panel 2 and collector array 6 of the projector 1 shown in FIG. 6. The LED panel 2 includes green LEDs 2a, red LEDs 2b, and blue LEDs 2c. The LEDs are arranged alternately such that in the x and y directions no two LEDs of the same colour are arranged next to one another. As can be seen in FIG. 7 in each row a green LED 2a, a red LED 2b and a blue LED 2c may be considered an element 10. However, this classification of an element could equally be made looking at columns rather than rows.

In the projector 1 of the embodiment shown in FIGS. 6 and 7 each LED has a corresponding collector 6, such that each collector 6 always collects light from the same LED 2.

Figure 8A:
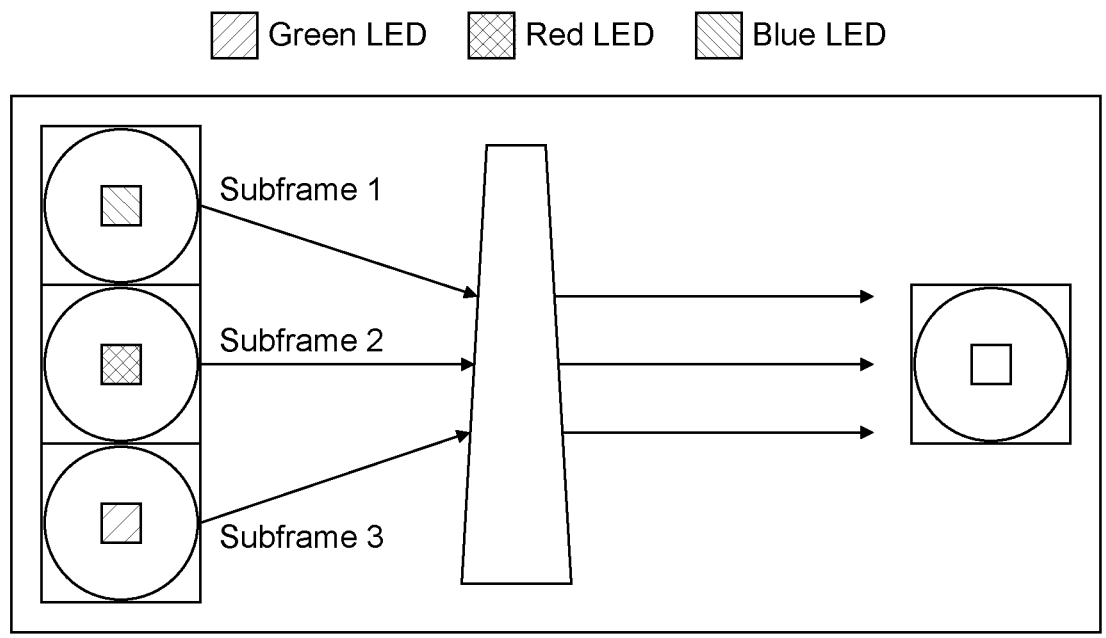
FIG. 8A is a schematic view showing how a full colour image pixel is formed from three different subframes for the projector as shown in FIG. 6.
Figure 8B:
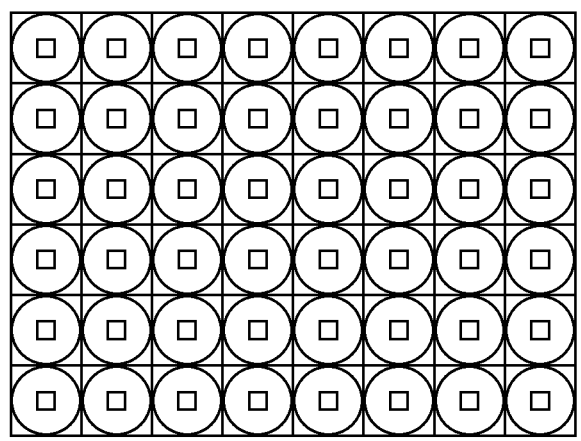
FIG. 8B is a face on view of the full colour image frame produced from the light from the three different subframes shown in FIG. 8A.

The ray angle shifter 12 can cause the light emitted from each of the LEDs, after passing through the collector 6 and projector lens 8, to be shifted. As can be seen in FIG. 8A the light from each colour LED is shifted such that each pixel of the image formed by the projector is illuminated from light from each colour LED. In each subframe light from a different colour LED illuminates each pixel. This provides an image that is full colour, as shown in FIG. 8B, which has the same pixel density as the number of collectors (and number of LEDs). Thus, rather than a 640×640 resolution as would be achieved with no displacement, the resolution is increased to 1920×1920.

Figure 9:
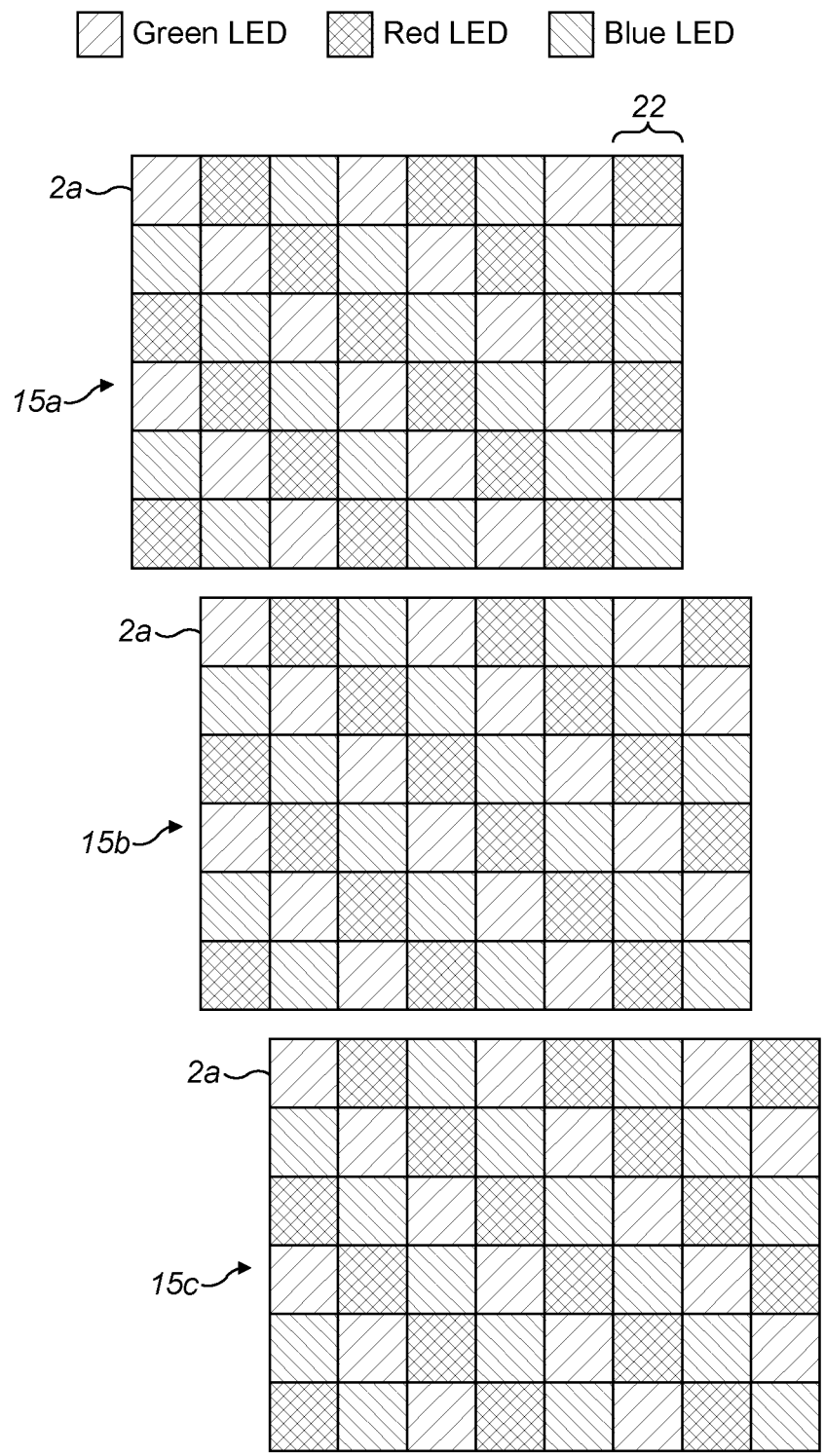
FIG. 9 is a schematic face on view of the three subframes produced using the projector shown in FIG. 6 in order to generate the full colour image frame shown in FIG. 8B.

FIG. 9 shows a schematic face on view of an example method of how the combination of different colour pixels using the projector of FIG. 6 may be obtained. Subframe 15a is formed of a number of pixels 22 each illuminated by a different colour LED.

Subframe 15b is formed through an angular shift of the light from each of the LEDs such that the ray angle shifter shifts the light from each LED in the horizontal direction by a pixel. This may be through a yaw rotation. As the LED are arranged in the panel in the sequence green, red, blue, through shifting the subframe across by 1 pixel, a pixel that was previously illuminated by a first colour will now be illuminated by a different second colour LED. In the final third subframe 15c the light is further shifted in angle such that the image is shifted across horizontally by a further pixel, such that the final of the three colours illuminates each pixel. This produces the full white colour image frame as shown in FIG. 8B having the same number of pixels as the number of collectors (and LEDs).

As can be seen in FIG. 9, two columns of pixels at either side will not be illuminated by each three colours of LEDs resulting in the resolution of the image not exactly being the same as the resolution of the number of LEDs. However, when forming an image of 1920 pixels these 4 redundant columns of pixels have a negligible effect.

The angular shifting between each subframe 15a 15b 15c may occur at 3× the frame rate, such that each subframe 15a 15b 15c is formed for a ⅓ of the time that each frame is displayed.

As each subframe 15a 15b 15c is shifted across by 1 pixel with respect to each other, each LED emits light relative to the pixel that it is illuminating. For instance, looking at the first green LED 2a in frame 15a it may emit light that is representative of the first top left pixel in the original image to be projected. In frame 15b the green LED 2a may emit light representative to one pixel in from the top left of the original image to be projected, and in subframe 15c the green LED 2a may emit light representative to two pixels in from the top left of the original image to be projected. This ensures that each pixel of the final image represents a single pixel in the original image that is to be projected.

In the projector shown in FIG. 6 the ray angle shifter 12 is a mirror that is configured to move in position. The light from the collectors is then reflected off the mirror by a different amount depending on the orientation of the mirror causing the displacement of the light.

When the mirror is in a first position the mirror causes no shift in the light such that each collector (and thus its associated LED) forms a pixel in the image as shown as subframe 15a. Upon movement of the mirror to a second orientation the subframe 15b is formed, and then finally a third subframe 15c when the mirror is orientated in a third position. The reflection of the light off the mirror depending on its orientation leads to the angular displacement of the light.

FIG. 10 shows a schematic top down view of a projector 1 according to another example embodiment of the present invention. The projector 1 is shown as projecting an image into waveguide 101 which is subsequently viewed by a user 201.

The projector 1 shown in FIG. 10 has an LED panel 2, a collector array 6, a projector lens 8, and ray angle shifter 12 similar to the projector as shown in FIG. 6. In the projector 1 shown in FIG. 10, unlike the projector 1 shown in FIG. 6, the collector array 6 is moveable and the LED panel 2 is static.

Figure 11A:
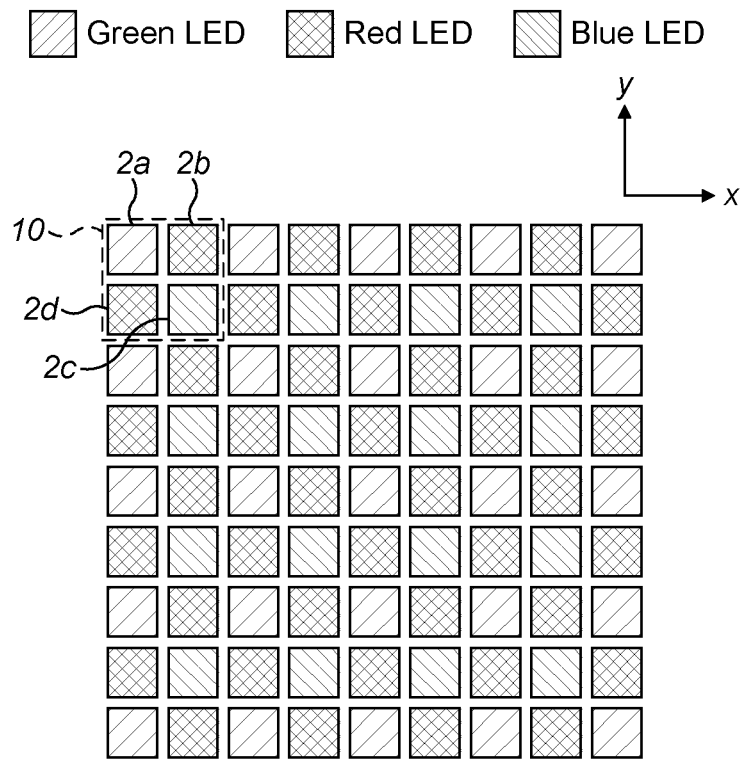
FIG. 11A is a schematic face on view of an LED panel of the projector as shown in FIG. 10.

FIG. 11A shows a front on view of the array of LEDs 2 of the projection display 1 shown in FIG. 10. As can be seen the array of LEDs include different colour LEDs. In the example shown in FIG. 3A the LEDs are red, green and blue. The LEDs are arranged into elements 10, each element made up of a 2×2 square array of LEDs as shown in the dashed square 10. Each element 10 includes two red 2b 2d, one green 2a, and one blue LED 2c. The elements 10 are repeated across the array of LEDs. The LEDs in this orientation are closely packed such that there is no space between neighbouring LEDs. With this close packed array of LEDs it is not possible to positon-position a collector over all of the LEDs at once.

Figure 11B:
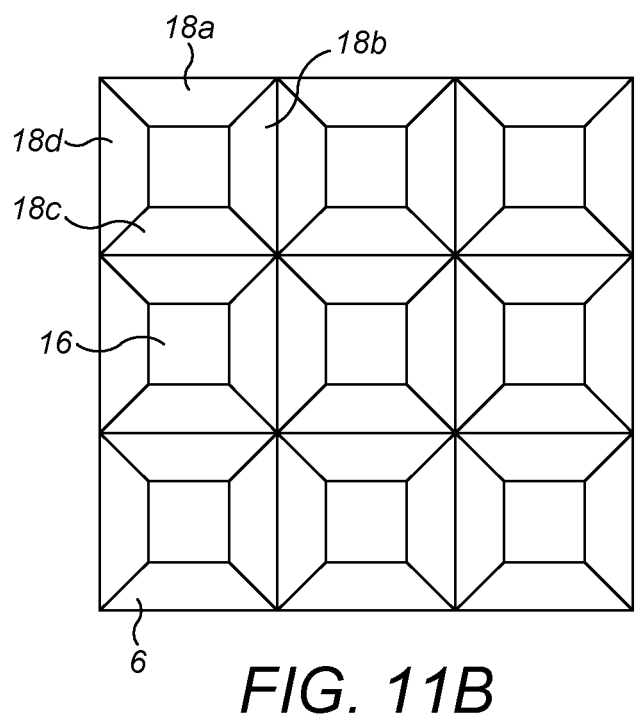
FIG. 11B is a schematic face on view of a collector array of the projector as shown in FIG. 10.

FIG. 11B shows a front on view of the array of collectors 6. In this embodiment further detail of the collectors 6 are shown, showing that the collectors are tapered well structures.

Figure 12A:
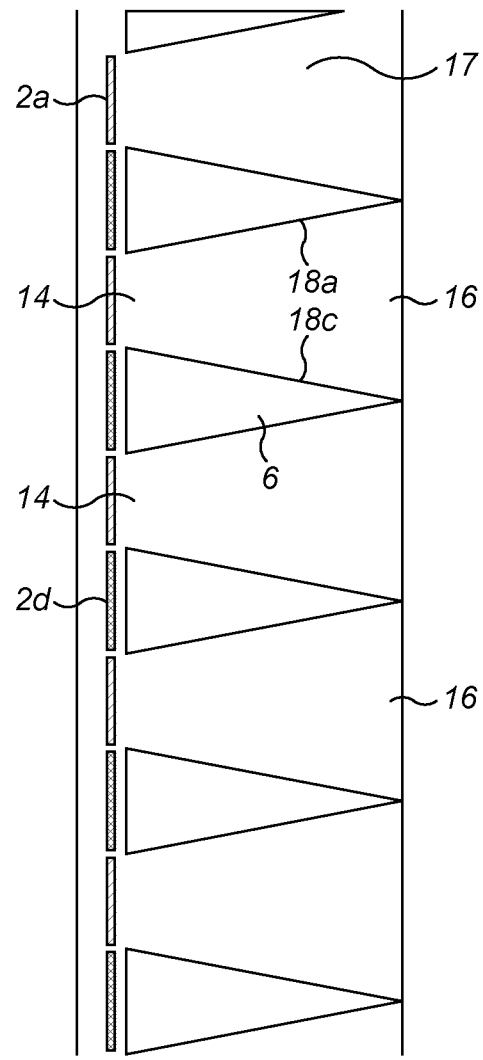
FIGS. 12A and 12B shows a schematic view of the LEDs and collectors showing a different positions of the collectors with respect to the LEDs for the projector as shown in FIG. 10.
Figure 12B:
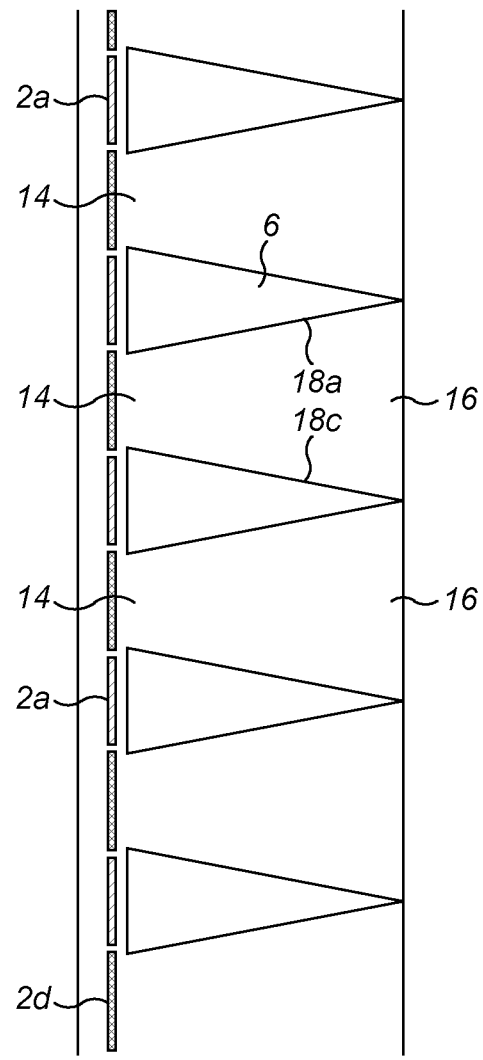

FIGS. 12A and 12B show a slice along the first column of LEDs as shown in FIG. 2A such that only the red 2d and green 2a LEDs are shown. The structure of the tapered well structures 6 is shown. Although these details are not shown for the embodiments shown in FIGS. 4 and 6, the collectors 6 of these embodiments may also be tapered well structures.

As can be seen in FIGS. 12A and 12B, each tapered well structure 6 comprises a conduit 17 running between an inlet 14 at the end proximal to the LEDs and an outlet 16 at the end distal to the LEDs. Each tapered well structure has four walls 18a 18b 18c 18d that form the structure of the tapered well structure 6. The walls of the tapered well structure are tapered such that the cross sectional area of the outlet 16 is larger than the cross sectional area of the inlet 14. This enables the light to be collected from the array of LEDs reducing the angle of emittance whilst increasing the area over which the light is transmitted. The walls 18a-d of the tapered well structure are formed of glass and act to contain the light within the conduit 17 of the tapered well structure 6.

As outlined above, in the embodiment shown in FIG. 10 the collectors (tapered well structures) are movable with respect to the array of LEDs. This is shown in FIGS. 12A, 12B, and FIG. 13A-D. As for the other embodiments, each collector is only capable of collecting light from a single LED at any one time. The reason for this is shown in FIGS. 12A and 12B. In FIG. 12A the tapered well structures 6 are positioned to collect light from the green LEDs 2a. In this configuration the inlet 14 of the tapered well structures 6 are positioned over the green LEDs 2a such that the green light is collected by the tapered well structure 6. The green light is contained within the tapered well structure by reflecting the green light off the walls 18 of the tapered well structures 6. The angle over which the light emitted from the LEDs is reduced, whilst the area over which the light is emitted is increased due to tapered nature of the well structures. In this arrangement the walls of the tapered well structure are positioned over the red LED 2d, and the other red and blue LEDs 2b 2c not shown in this view, such that light from these LEDs is not collected. FIG. 12B shows a different orientation of the tapered well structures 6 with respect to the LEDs, where the tapered well structures 6 are positioned to collect light from the red LEDs 2d. In this configuration the inlet 14 of the tapered well structures 6 collects light from the red LED 2d whilst the light from the other LEDs 2a 2b 2c is blocked by the walls 18 of the tapered well structures.

FIG. 13A-D show face on views of the different positions of the tapered well structures 6 with respect to the array of LEDs 2. In FIG. 13A the collectors are positioned over the green LEDs 2a such that each collector is illuminated with light from the green LED 2a of its associated element 10. This is as shown in FIG. 12A. In FIG. 13B the array of collectors have moved along the plane in the +x direction such that they are now positioned over the red LED 12b, such that the red LED 12b of each element 10 illuminates the collectors. In FIG. 13C the array of collectors have moved in the plane in the −y direction such that they are now positioned over the blue LED 12c, such that the blue LED 12c of each element 10 illuminates the collectors. In FIG. 13D the array of collectors have moved in the plane in the −x direction such that they are now positioned over the red LED 12d, such that the red LED 12d of each element 10 illuminates the collectors. The process then repeats again for the next image frame.

When the pitch of the LEDs (distance between the centres of two neighbouring LEDs) is 3 µm in both the x and y direction, the pitch between the collectors may be 6 µm. Thus, the movement of the collectors may be by 3 µm in the x and y directions to achieve the movement as shown in FIGS. 13A to 13D.

The movement between each of the positions shown in FIG. 13A to 13D is at a speed faster than the frame rate. In fact, the speed of the movement is at four times the frame rate to ensure that the collector is at each position shown in FIGS. 13A to 13D for each frame.

Figure 14:
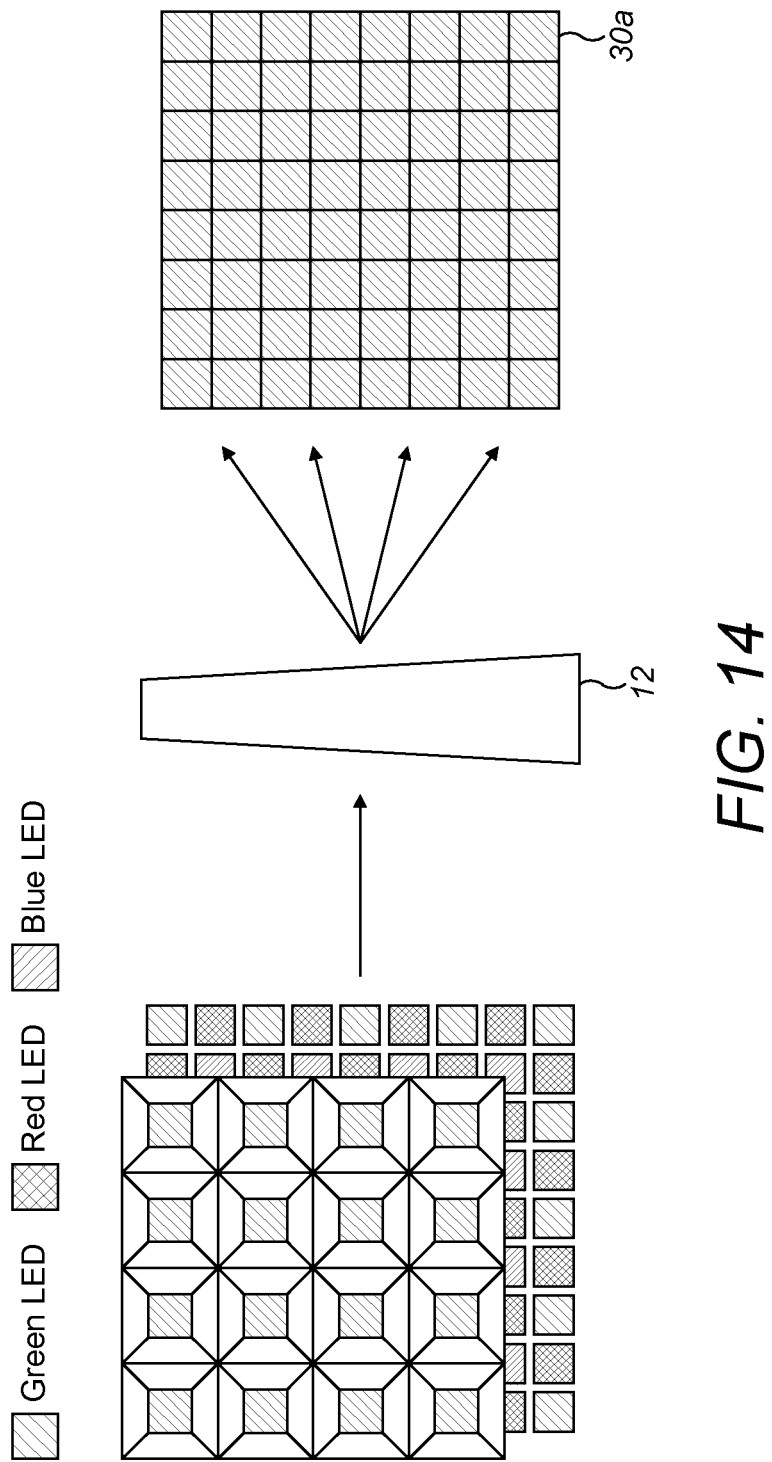
FIG. 14 shows a schematic view of the ray angle shifter converting the light from a first position into a green subframe with increased resolution for the projector as shown in FIG. 10.

As illustrated in FIG. 14 when the collectors are arranged in the position shown in FIG. 13A, where they are positioned to collect light from the green LED, the ray angle shifter is configured to cause an angular displacement of the light from the collectors so as to increase the resolution of the resulting green subframe that is formed. Therefore, for instance, rather than forming an image that is 540 pixels in each direction, which would be the case without the ray angle shifter, the resolution of the image is increased to 1080 pixels such that it is equal to the number of LEDs in the LED array 2. This is shown as green subframe 30a.

Figure 15:
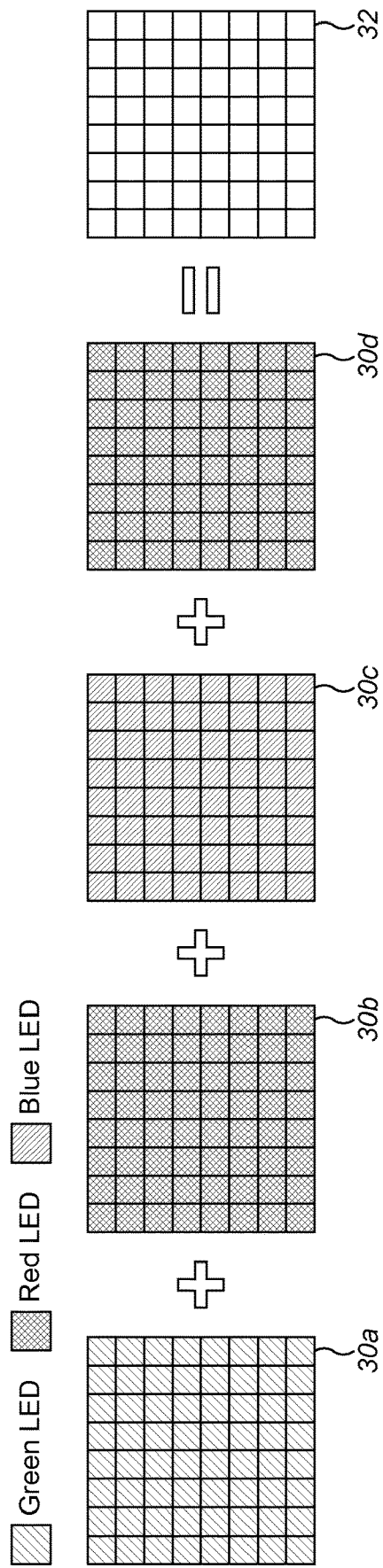
FIG. 15 shows a face on schematic view of the series of subframes formed by each of the positions of the collector with respect to the LED array as shown in FIG. 13A to 13D and the full colour image frame that is produced.

By causing the angular shift using the ray angle shifter for each of the positions shown in FIG. 13A-D four subframes are produced as shown in FIG. 15. Subframe 30a is the green subframe as shown in FIG. 14. Subframe 30b is a red subframe formed when the collectors 6 are in the position as shown in FIG. 13B. Subframe 30c is a blue subframe formed when the collectors 6 are in the position shown in FIG. 13C. Subframe 30d is a red subframe formed when the collectors are in the position shown in FIG. 13D. Each of these subframe are combined together to form full colour frame 32. Each of the subframes 30a-d and the full colour frame 32 are 1080×1080 pixels resulting in no loss in resolution.

Figure 16A:
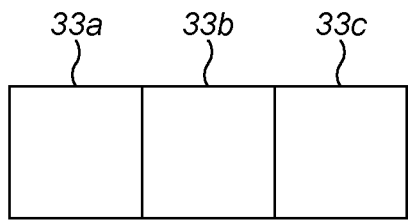
FIG. 16A-E shows a schematic face on view of an example shifting of light such that the resolution of the image produced by each position shown in FIG. 13A-D can be increased.

Further details on how the angle shifter enables an increase in resolution will now be described in relation to FIG. 16A-E. FIG. 16A shows three pixels formed by the light emitted from three collectors 6. For instance, this may be the first three collectors in the top row when in the position shown in FIG. 13A and FIG. 14 emitting green light. The three pixels are labelled 33a, 33b and 33c. As outlined above, the resolution of this subframe is 540 pixels in both the horizontal and vertical dimensions, rather than the desired 1080 pixels, owing to the fact that the LED arrays are 2×2 and only a single one of the 2×2 LEDs is collected.

The LEDs may be controlled by a signal processor (not shown) which provides signals which control the LEDs to form the image. In the arrangement shown in FIG. 16A, initially the image to be projected is downsized to 540×540 pixels with each projected pixel representing an average value of four pixels of the original image. For instance, pixel 33a is the average of 4 pixels of the original image, 33b is an average of 4 pixels of the original image, and 33c is an average of 4 pixels of the original image.

Figure 16B:
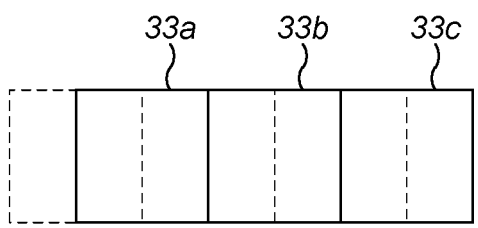

The ray angle shifter 12 then causes a shift of light projected across by ½ a pixel as shown in FIG. 16B, such that the light is projected to form the three pixels 33a 33b 33c that are angularly shifted with respect to the pixels in FIG. 16A by ½ a pixel. The dotted lines show the position of the light in the previous projection. When projecting at the position in FIG. 16B the LEDs are controlled by the signal processor to project a second downsized image of 540×540 pixels that is based on the original image shifted across by 1 pixel. In this way, pixel 33a in FIG. 16B is the average of 4 pixels of the original image but starting from 1 pixel in, i.e. starting from the second column of pixels of the original image. The other pixels 33b and 33c are also correspondingly shifted.

Figure 16C:
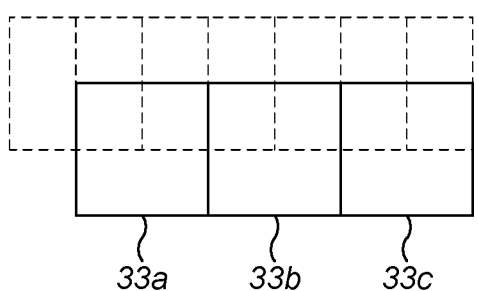

The ray angle shifter then results in a shift of the light down by ½ a pixel as shown in FIG. 16C, such that the light is projected to form the three pixels 33a 33b 33c that are angularly shifted with respect to the pixels in FIG. 16B down by ½ a pixel. When projecting at the position in FIG. 16B the LEDs are controlled by the signal processor to project a third downsized image of 540×540 pixels that is based on the original image shifted across by 1 pixel and down by 1 pixel. In this way, pixel 33a in FIG. 16C is the average of 4 pixels of the original image but starting from 1 pixel in and 1 pixel down, i.e. starting from the second column of pixels of the original image and the second row. The other pixels 33b and 33c are also correspondingly shifted.

Figure 16D:
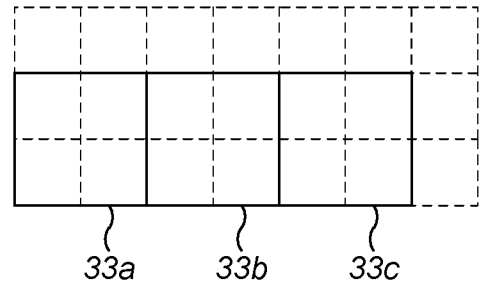

The ray angle shifter then results in a shift of the light across by ½ a pixel as shown in FIG. 16D, such that the light is projected to form the three pixels 33a 33b 33c that are angularly shifted with respect to the pixels in FIG. 16C across by ½ a pixel. When projecting at the position in FIG. 16C the LEDs are controlled by the signal processor to project a fourth downsized image of 540×540 pixels that is based on the original image shifted across down by 1 pixel. In this way, pixel 33a in FIG. 16D is the average of 4 pixels of the original image but starting from 1 pixel down, i.e. starting from the second row of pixels of the original image. The other pixels 33b and 33c are also correspondingly shifted.

Figure 16E:
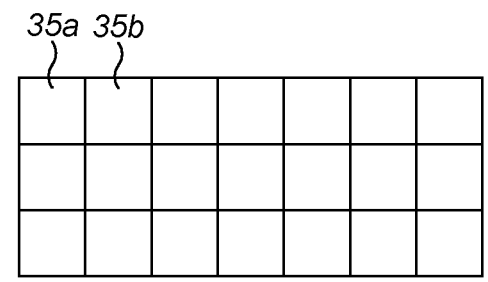

FIG. 16E shows a portion of the image that is created from this shifting as shown in FIG. 16A to 16D. As can be seen through this combination of different shifts in position, the number of pixels 35a 35b within the image is greatly increased. By carrying out each of these shifts for each of the positions shown in FIGS. 13A to 13D each of the frames 30a 30b 30c and 30d are formed having a 1080 resolution in both axes forming the full colour 1080 frame 32. By doing this for each image frame the resolution can be increased from 540×540 to 1080×1080 forming a full colour image with this increased resolution.

The shifting of pixels as shown in FIGS. 16A to 16D is described above as being performed by the ray angle shifter which causes an angular shift of the pixels. In an alternative embodiment the effect described in FIGS. 16A to 16D may instead be achieved through a spatial movement of the light rather than an angular movement. Rather than having a ray angle shifter, the effect may be produced using a movement of the array of LEDs 2 and collectors 6, this is in addition to the relative movement of the collectors with respect to the LEDs as shown in FIGS. 10 and 13A-D. For instance, the array of LEDs 2 and array of collectors 6 may be mounted on a mechanism that allows movement of both with respect to the projector lens 8 in the plane along the x and y direction. The movement may be the same as shown in FIG. 16A to 16D with a movement by ½ a pixel (i.e. ½ the size of the collimator) in the +X-direction, ½ a pixel down in the −y direction, ½ pixel across in the −x direction, and then finally back up (½ pixel in +y direction) to the original positon-position. In this way, the pixels as shown in FIGS. 16A-D are formed. With this movement carried out when the collector is in each of the positions shown in FIGS. 13A to 13D a full colour frame 32 as shown in FIG. 15 can be achieved.

The LED as shown in all of the above embodiments may be micro LEDs. This is particularly preferable in pico projector design due to the small size of micro LEDs. Each typical micro LED may have an area of less than 0.04 mm². However, in other arrangements the LEDs may be standard size LEDs depending on the use of the projector.

In the above description, the term frame is used to refer to a frame of an image, i.e. an image that is formed by the projector. The frame may be built up by a series of subframes that are displayed in quick succession such that the frame appears to the viewer to be a static image. The frame may be updated in time at a rate commonly known as the frame rate. For instance, the projector may operate displaying frames at a frame rate of 60 Hz. Therefore, in the above embodiments where there are three subframes they may be displayed at 180 Hz. For the embodiment shown in FIG. 4 the movement of the LEDs may be at 180 Hz. For the embodiment shown in FIG. 6 the shift between each of the subframes 15 15b 15c in FIG. 9 may be at 180 Hz. For the embodiment shown in FIG. 10 the movement of the collector between each position may be 240 Hz (as there are four positions). The shifting of the light between the positions shown in FIG. 16A-D may be at 960 Hz. The above is based on a frame rate of 60 Hz, other frame rates may be used.

Having described aspects of the disclosure in detail, it will be apparent that modifications and variations are possible without departing from the scope of aspects of the disclosure as defined in the appended claims.

In the above description regarding FIG. 9 it is shown that the subframes are formed through a shift across by one pixel in the horizontal direction. Alternatively, the shifting may be in the vertical direction which would result in a similar outcome. The shifting may depend on the size and orientation of the elements and their respective LEDs.

The resolutions described above are not limiting, and are merely examples. For instance, where it is described that the resolution in increased from 640×640 to 1920×1920 it would be understood that the original frame may have any resolution and a corresponding increase would be achievable.

The collectors in the embodiments above are described as being tapered well structures. Alternatively, the array of collectors may be an array of microlenses. The microlenses may provide the same effect as the tapered well structures by collecting the light from the LEDs and reducing the angle over which they emit. Thus, solving the issues of Lambertian emission. In other arrangements, the projectors of the above embodiments may comprise both the array of microlens and the array of tapered well structures.

The colours of LEDs shown in the embodiments above are RGB. However, the invention is not limited as such and any combination of colour LEDs may be used. For instance, the LEDs may be red, blue and yellow. Alternatively, in FIG. 11A the 2×2 array could be green, red, blue and white LEDs.

In addition, each element is not limited to having the colour and number of LEDs shown. For instance, the embodiment shown in FIG. 10 may equally work for elements that are not 2×2. For instance, the elements may be a 3×1 array of LEDs, such as RGB. In this arrangement the collectors would only need to move in a single direction in the plane, for instance in the x-direction. In addition, the range of positions shown in FIG. 16A to 16B would be adjusted according to ensure full resolution is achieved.

In the embodiments shown displacement of the light may be achieved through using an angle shifter as described in relation to FIG. 6 and FIG. 10 such as a moveable mirror, or it may be a spatial displacement of the light such as through the movement of the array of LEDs and collectors as described in relation to FIG. 10 without the ray angle shifter. However, as a further alternative the displacement may be provided by a shifting plate that moves in angle. For instance, a nutating plate may be positioned after the collector array before the projector unit. The nutation of the plate, through tilting in different directions, may provide a motion of the light rather than a ray angle shifter after the projector lens or the movement of the ray of LEDs and collector. Alternatively, an oscillating glass wedge may be used to provide the apparent optical motion. The light enters the glass wedge and may be refracted such that the light is caused to have an optical shift. Through movement of this wedge the light may be moved in the manners described for the embodiments above in order to provide the same desired effects. In other arrangements any mechanisms for causing a shift in the light may be used.

In the embodiment shown in FIG. 4 the LED panel is moveable with the collectors static. In other arrangements, it may be the other way around with the collectors being movable and the LED panel being static. However, this may require a ray angle shifter or similar mechanism in order so that the subframes formed by the moving collectors overlap one another to form the image.

The arrangement shown and described in relation to FIG. 16A-D is one example. The movement may be achieved in any manner. In addition, the sampling of the image that is displayed is not limited to the manner described.

In the above embodiments the projector is shown as projecting an image into a waveguide. However, the projector may be used to project a light into any type of device and onto any type of display, it is not necessarily restricted to a waveguide.

The invention claimed is:

1. A projector for generating a frame of an image, the projector comprising:
an array of elements arranged in a plane, each element comprising at least three LEDs which have different respective colours;
an array of collector structures, each collector structure configured to receive light from a single LED at any one time and reduce an angle over which the single LED emits light; and
a projector unit configured to receive the light from the array of collector structures and collimate the light such that a frame is formed;
wherein the frame is full colour and formed from combining a plurality of subframes, each subframe being a single colour, the subframes formed through one or both of the following:
a spatial movement of the array of elements with respect to the array of collector structures such that each collector structure receives light from a different LED during each subframe; or
a displacement of the light emitted from each LED such that the light from each LED illuminates multiple pixels of the frame.

2. The projector of claim 1, wherein the projector unit comprises an optical element that is configured to be adjustable for causing the displacement of the light emitted from each LED such that the light from each LED illuminates multiple pixels of the frame.

3. The projector of claim 1, wherein the array of elements is configured to be moveable to provide the spatial movement of the array of elements with respect to the array of collector structures.

4. The projector of claim 1, wherein the array of collector structures is configured to be moveable to provide the spatial movement of the array of elements with respect to the array of collector structures.

5. The projector of claim 1, wherein the array of collector structures are an array of microlenses, or an array of tapered well structures.

6. The projector of claim 1, wherein the at least three LEDs comprise a red LED, a blue LED and a green LED.

7. The projector of claim 1, wherein:
each element comprises four LEDs; and
the four LEDs are arranged in a 2 by 2 configuration in the plane.

8. The projector of claim 1, wherein in a first subframe a first LED of the at least three LEDs illuminates a first pixel, in a second subframe a second LED of the at least three LEDs illuminates the first pixel, and in a third subframe a third LED of the at least three LEDs illuminates the first pixel.

9. The projector of claim 1, wherein the LEDs are microLEDs.

10. An augmented reality, or virtual reality device, comprising the projector of claim 1.

11. A projector display system comprising:
a display for displaying an image; and
the projector according to claim 1.

12. A method of generating a frame of an image using a projector, the method comprising:
emitting light from an array of elements arranged in a plane, each element comprising at least three LEDs which have different respective colours;
receiving the light emitted from the array of elements at an array of collector structures, each collector structure receiving light from a single LED at any one time to reduce an angle over which the single LED emits light;
emitting the light from an array of collector structures that has been reduced in angle; and
receiving the light from the array of collector structures at a projector unit and collimating the light such that a frame is formed;
wherein the frame is full colour and formed from combining a plurality of subframes, each subframe being a single colour, the subframes formed through one or both of the following:
a spatial movement of the array of elements with respect to the array of collector structures such that each collector structure receives light from a different LED during each subframe; or
a displacement of the light emitted from each LED such that the light from each LED illuminates multiple pixels of the frame.

13. The method of claim 10, wherein the array of collector structures comprises an array of microlenses, or an array of tapered well structures.

14. The method of claim 10, wherein the at least three LEDs comprise a red LED, a blue LED and a green LED.

15. The method of claim 10, wherein:
each element comprises four LEDs; and
the four LEDs are arranged in a 2 by 2 configuration in the plane.

16. The method of claim 10, wherein in a first subframe a first LED of the at least three LEDs illuminates a first pixel, in a second subframe a second LED of the at least three LEDs illuminates the first pixel, and in a third subframe a third LED of the at least three LEDs illuminates the first pixel.

17. The method of claim 10, wherein the LEDs are microLEDs.

18. A display, comprising:
a projector for generating a frame of an image, the projector comprising:
an array of elements arranged in a plane, each element comprising at least three LEDs which have different respective colours;
an array of collector structures, each collector structure configured to receive light from a single LED at any one time and reduce an angle over which the single LED emits light; and a projector unit configured to receive the light from the array of collector structures and collimate the light such that a frame is formed;

wherein the frame is full colour and formed from combining a plurality of subframes, each subframe being a single colour, the subframes formed through one or both of:

a spatial movement of the array of elements with respect to the array of collector structures such that each collector structure receives light from a different LED during each subframe; or a displacement of the light emitted from each LED such that the light from each LED illuminates multiple pixels of the frame.

19. The display of claim 18, wherein the array of collector structures comprises an array of microlenses, or an array of tapered well structures.

20. The display of claim 18, wherein the at least three LEDs comprise a red LED, a blue LED and a green LED.

* * * * *